Patented Mar. 7, 1944

2,343,845

UNITED STATES PATENT OFFICE 2,343,845

SYNTHETIC RESIN

Paul O. Powers, Manheim Township, Lancaster County, Pa., assignor to Armstrong Cork Company, Lancaster, Pa., a corporation of Pennsylvania No Drawing. Application December 20, 1941, Serial No. 423,818

19 Claims. (Cl. 260—62)

This invention relates to synthetic resins and more particularly to a process of preparing synthetic resins from a terpene and a phenol; and it comprises a process whereby a terpene and a phenol are reacted in the presence of a small amount of molecular compound of boron trifluoride and the resinous product so formed is separated from the reaction mixture, advantageously by vacuum distillation; all as more fully hereinafter set forth and as claimed.

Resins prepared from terpenes and phenols are widely used in the manufacture of paints, varnishes, lacquers, insulators, antiseptics, and as an ingredient in various compositions for degreasing and cleaning. These resins are prepared by reacting various terpenes such as dipentene, pinene, limonene, and various turpentine cuts with phenols such as phenol, cresol, alkylated phenols, for example, normal butyl phenol, tertiary butyl phenol, propyl phenol and the like, and other reactive phenolic compounds.

In the method of preparing resins from terpenes and phenols, various catalysts have been used to expedite the reaction. Among the catalysts used are sulphuric acid, sulphonic acids, aluminum chloride, and other similar acid catalysts. The use of these catalytic materials accelerates the terpene-phenol reaction, but the use of these catalysts also presents many disadvantages. Probably the greatest disadvantage resulting from the use of the acid catalysts heretofore known is the formation of undesirable oily polymers during the reaction. This formation of undesirable polymers is due to the high catalytic activity of the catalyst employed. In addition to causing the formation of polymers, certain of the catalysts employed, particularly sulphuric acid catalysts, tend to cause undersirable oxidation reactions to take place during the formation of the resinous products. The formation of polymers and oxidation products decreases greatly the yield of terpene phenolic resins. In addition, many of the catalysts heretofore employed, particularly aluminum chloride, are very susceptible to moisture which greatly reduces their catalytic effect. Furthermore, it is quite difficult to remove residual traces of the catalysts from the final reaction product. In addition aluminum chloride catalysts must be neutralized upon completion of the reaction which neutralization step is both expensive and difficult.

In an attempt to overcome the difficulties heretofore experienced, the method of preparing various polymers and condensation products by conducting reactions in the presence of rather complicated organic compounds having a reactive inorganic catalytic group has been employed. Although the use of catalysts of this type overcomes many of the objections to the catalyst itself, the results obtained are none too good. The use of these catalysts results in low yield of resinous products and a product having a rather low melting point. In addition, the catalyst itself is very expensive to prepare, and the poor yields obtained make this method of little practical value.

I have found a method of preparing resins from terpenes and phenols in which a terpene, such as dipentene, alpha pinene, beta pinene, limonene or mixtures of various terpenes such as turpentine, is reacted with a phenol, such as phenol, cresol, propyl phenol, normal butyl phenol, tertiary butyl phenol and the like, in the presence of molecular compound of boron trifluoride, and the resulting resinous product is separated from the reaction mixture by any suitable means such as steam or vacuum distillation.

The method of my discovery is particularly advantageous in that the resins produced are of high melting points and are relatively light in color. Another advantage of the method lies in the fact that extraordinarily high yields are obtained. A further advantage is that the catalysts employed are of such a nature that there is very little formation of any undesirable products such as oily polymers or oxidation products. Still another advantage lies in the fact that the catalysts employed are easily prepared, may be easily handled during the reaction and may be easily separated from the reaction products formed, resulting in a greatly improved final resinous product, which is free from catalytic impurities. Another advantage possessed by the method of my invention over the methods of the prior art lies in the fact that the method may be successfully carried out by employing turpentine or fractions of turpentine as the terpene hydrocarbon reactant. The resins produced from the turpentine fraction and phenols possess excellent color and the yields are much higher than is the case when the catalysts of the prior art are employed. The use of turpentine or turpentine fractions naturally results in a great reduction in the cost of resin preparation, inasmuch as turpentine is readily available in large quantities whereas the supply of relatively pure terpenes, which are necessary for the preparation of terpene phenolic resins when the methods of the prior art are followed, is greatly limited.

The molecular compounds of boron trifluoride which are employed as catalysts in the method of my invention may be molecular compounds of boron trifluoride and ethers, for example, di-ethyl ether, methyl-n-propyl ether, methyl-isopropyl ether, ethyl-n-propyl ether, ethyl-isopropyl ether, dipropyl ether, di-isopropyl ether, ethyl-n-butyl ether, ethyl isobutyl ether, ethyl tertiary butyl ether, di-n-butyl ether, di-isobutyl ether, di-isoamyl ether and the like; of boron trifluoride and aliphatic acids, for example, acetic acid, propionic acid, n-butyric acid, valeric acid and the like; of boron trifluoride and aliphatic alcohols, for example, ethyl alcohol, propyl alcohol, isopropyl alcohol, butyl alcohol, isobutyl alcohol, amyl alcohol, isoamyl alcohol, and the like; boron trifluoride with phenols, for example, phenol, cresol, alpha naphthol, beta naphthol, tertiary butyl phenol, and the like. Advantageous results have been obtained with molecular compounds containing about 35% to about 55% of boron trifluoride. Particularly advantageous results are obtained when the catalyst contains about 45% of boron trifluoride. The use of these molecular compounds of boron trifluoride results in a reaction which is much more easily controlled and, therefore, there is very little formation of undesirable polymers or oxidation products, as is the case when the acid catalysts of the prior art are employed. The amount of dipolymer oil formed is greatly reduced when these catalysts are employed.

In carrying out the method of my invention, a mixture of a terpene and a phenol is added to the catalyst in any suitable container. The addition of the terpene phenol mixture to catalyst may be effected in thirty minutes to one hour, but the rate of addition may be increased or decreased as desired. The reaction is substantially completed at the end of the addition time, and the terpene phenolic resin may be then separated from the reaction mixture, although the reaction mixture may be allowed to stand for a period of time before separation of the resinous products therefrom. Any suitable method of recovering the resins from the reaction mixture may be used. However, it has been found that a high melting point resin can usually be best obtained by vacuum distillation. The reaction may be successfully caried out at varying degrees of temperature. Although the yield and quality of the resin is not greatly altered by varying the temperature of the reaction, the best yields have been obtained at temperatures of from about 30° C. to about 70° C.

The reaction may be conducted at atmospheric pressure, and may also be conducted at subatmospheric or superatmospheric pressures. In some instances, particularly when the molecular compound of boron trifluoride employed as a catalyst is somewhat volatile, it is advantageous to conduct the reaction under slightly elevated pressure, that is, pressures of about 1–10 atmospheres.

The concentration of terpene and phenol employed may be widely varied. However, particularly advantageous resinous products are obtained when the ratio of terpene to phenol is on the order of five to six parts of terpene to about one part of phenol. The employment of this ratio of terpene and phenol results in an extremely high yield of a light colored, high melting point resin, and a minimum amount of undesirable oily polymers. Highly desirable products are obtained when other ratios are used, but when more than five to six parts of terpene are employed, the yield of dipolymer oil is somewhat increased.

In a particularly advantageous modification of my invention, a terpene-phenol mixture containing about five parts of terpene to about one part of phenol is added to a molecular compound of boron trifluoride and a small amount of an inert solvent. Toluene is the preferred solvent, but other solvents which may be employed are benzol, naphtha, gasoline, petroleum ether, xylene, ethylene dichloride, carbon tetrachloride and the like. When the addition of the terpene-phenol mixture to the catalyst and inert solvent is completed, the terpene phenolic resin is separated from the reaction mixture by vacuum distillation. During the addition of terpene-phenol mixture to catalyst, the reaction vessel is maintained under a slightly elevated pressure.

In another modification of my invention, a terpene and a phenol are reacted in the presence of a molecular compound of boron trifluoride and the resinous product is recovered by distillation at about 10 mm. vacuum. Any unreacted terpene or dipolymer oil which may be present in the distillate is then recycled by any suitable means and mixed with a fresh supply of terpene and phenol and the mixture is reacted in the presence of a boron trifluoride ether addition compound. The effect of recycling the terpene and dipolymer oil results in an increase in the yield of hard resinous product and a decrease in the formation of undesirable reaction products. The recycling step may be operated continuously and higher yields or purer products are obtained. The presence of unreacted terpene or dipolymer in the distillate may be readily ascertained from the boiling points at which the fractions come over from the still.

The following specific examples are illustrative of my invention. These examples are given by way of illustration and not by limitation.

*Example 1*

A mixture containing 170 grams of turpentine and 30 grams of phenol was added to a reaction flask containing 5 cc. of a molecular compound of boron trifluoride and diethyl ether containing 45% by weight of boron trifluoride. The reaction flask was immersed in a water bath, and the temperature was maintained at 25° C. The addition of the turpentine-phenol mixture was controlled so that a period of 30 minutes was required to completely add the mixture to the catalyst. At the end of this period the resin formed was separated from the reaction mixture by means of steam distillation. One hundred and one grams of a pale colored resin having a melting point of 96° C., as determined by the ball and ring method, was obtained as residue.

*Example 2*

A mixture containing 170 grams turpentine containing .01% moisture and 30 grams phenol was added to a reaction flask containing 3 cc. of a molecular compound of boron trifluoride and diethyl ether containing 38% by weight boron trifluoride. The flask was immersed in a water bath and the temperature of reaction maintained at 30° C. The addition of the turpentine-phenol mixture was controlled so that one hour was required before complete addition. At the end of this time, the resin formed was separated from the reaction mixture by distilling at 10 mm. vacuum. Eighty-six grams of resin having a melting point of 105° C., as determined by the ball and ring method, were obtained as residue. The resin was pale in color.

Example 3

A mixture containing 170 grams of alpha pinene and 30 grams of phenol were added to a flask containing 3 cc. of a molecular compound of boron trifluoride and diethyl ether containing 50% boron trifluoride by weight and 20 cc. of toluene. The reaction flask was immersed in an ice bath so that the temperature of reaction could be maintained between 0° C. and 5° C. At the end of forty-five minutes, the time required for addition of the alpha pinene-phenol mixture, the resin formed was separated from the reaction mixture by distilling at 5 mm. vacuum. One hundred and four grams of a pale colored resin having a melting point of 100° C. as determined by the ball and ring method were recovered as residue.

Example 4

A mixture containing 170 grams of alpha pinene and 30 grams of phenol were added to the reaction flask containing 20 cc. of toluene and 3 cc. of a molecular compound of boron trifluoride and diethyl ether containing 41% by weight boron trifluoride. The flask was immersed in a cold water bath so that the temperature of reaction would remain between 10° C. and 15° C. At the end of one hour, the time required for addition of all of the alpha pinene-phenol mixture, the resin formed was recovered. One hundred and five grams of a pale colored resin having a melting point of 97° C. determined by the ball and ring method were recovered as residue.

Example 5

A mixture containing 170 grams of alpha pinene and 30 grams of phenol were added to a reaction flask containing 3 cc. of a molecular compound of boron trifluoride and ethyl-n-propyl ether containing 45% by weight boron trifluoride. The reaction flask was immersed in a water bath and the temperature of reaction maintained between 35° C. and 45° C. At the end of thirty minutes, the time required for addition of alpha pinene-phenol mixture, the resin formed was separated from the reaction mixture by means of steam distillation. One hundred and thirty-four grams of a pale colored resin having a melting point of 79° C. determined by the ball and ring method were recovered as residue.

Example 6

A mixture containing 170 grams alpha pinene and 30 grams phenol were added to a reaction flask containing 3 cc. of a molecular compound of boron trifluoride and ethyl-n-propyl ether containing 52% boron trifluoride by weight. The reaction flask was immersed in a water bath and was maintained at a temperature of 45° C. to 55° C. during the reaction period. At the end of thirty-five minutes, the time required for the addition of all of the alpha pinene phenol mixture, the resin formed was separated from the reaction mixture by steam distillation. One hundred and forty-five grams of a pale colored resin having a melting point of 78° C. determined by the ball and ring method were recovered as residue.

Example 7

A mixture containing 170 grams of alpha pinene and 30 grams of phenol was added to a reaction flask containing 20 cc. of toluene and 3 cc. of a molecular compound of boron trifluoride and diethyl ether containing 47% by weight boron trifluoride. The reaction flask was immersed in a water bath and maintained at a temperature of 85° C. and under a pressure of 10 atmospheres during the reaction. At the end of fifty minutes, the time required for the addition of all of the alpha pinene-phenol mixture, the resin formed was separated from the reaction mixture by steam distillation. One hundred and eighteen grams of a pale colored resin having a melting point of 89° C. determined by the ball and ring method were recovered as residue.

Example 8

A mixture containing 350 grams of beta pinene and 50 grams of phenol were added to a flask containing 3 cc. of a molecular compound of boron trifluoride and diethyl ether containing 45% by weight boron trifluoride. The reaction flask was immersed in a water bath and the temperature maintained at 23° C. during the reaction. At the end of forty-five minutes, the time required for the addition of all of the beta pinene phenol mixture, the resin formed was separated from the reaction mixture by steam distillation. Two hundred and ten grams of a pale colored resin having a melting point of 89° C., as determined by the ball and ring method were recovered as residue.

Example 9

One hundred grams of beta pinene and 20 grams of phenol were added to a flask containing 1 cc. of a molecular compound of boron trifluoride and methyl isopropyl ether containing 45% by weight boron trifluoride. The flask was immersed in a water bath and the temperature maintained at 23° C. during the reaction. At the end of thirty minutes, the time required for the addition of all of the beta pinene and the phenol, the resin formed was separated from the reaction mixture by distilling at 10 mm. vacuum. Sixty-seven grams of a light colored resin having a melting point of 114° C. determined by the ball and ring method were recovered as residue.

Example 10

One hundred seventy grams of fresh turpentine and 25 grams of turpentine which had been recovered from a previous reaction and 30 grams of phenol were mixed, and added to a flask containing 3 cc. of a molecular compound of boron trifluoride and diethyl ether containing 45% by weight boron trifluoride. The flask was immersed in a water bath and the temperature maintained at 30° C. during the reaction. At the end of forty-five minutes, the time required for the addition of all of the turpentine phenol mixture, the resin formed was separated from the reaction mixture by distilling at 10 mm. vacuum. One hundred and thirty grams of a light colored resin having a melting point of 94.7° C. determined by the ball and ring method were recovered as residue.

Example 11

One hundred and seventy grams of fresh turpentine, 25 grams of turpentine recovered from the reaction residue of a previous batch, 125 cc. of dipolymer oil formed in a previous reaction mixture and 30 grams of phenol were added to a flask containing 3 cc. of a molecular compound of boron trifluoride and methyl-n-propyl ether containing 46% by weight boron trifluoride. The reaction flask was immersed in a water bath at a temperature maintained at 35° C. during the reaction. At the end of thirty-five minutes, the time required for the addition of all of the turpentine phenol dipolymer mixture to the catalyst, the resin formed was separated from the reaction mixture by steam distillation. One hundred and thirty-three grams of a light colored resin having a melting point of 93° C. determined by the ball and ring method were recovered as residue.

*Example 12*

Fifty grams of beta pinene, 100 cc. of recovered dipolymer oil and 50 grams of phenol were added to a flask containing 3 cc. of a molecular compound of boron trifluoride and methyl isopropyl ether containing 45% by weight boron trifluoride. The reaction flask was immersed in a water bath and the temperature maintained at 30°. C. during the reaction period. At the end of forty-five minutes, the time required for the addition of the beta pinene-dipolymer oil-phenol mixture to the catalyst, the resin formed was separated from the reaction mixture by steam distillation. One hundred and thirty grams of a pale colored resin having a melting point of 90° C. determined by the ball and ring method were recovered as residue.

It should be understood that the above examples are not meant to limit the scope of the invention. The catalyst employed may be substituted for by other molecular compounds of boron trifluoride. Other phenols may also be used as one of the reactive materials and various terpenes are capable of giving equally excellent results. The quantities of reactants may also be varied.

Since the resins produced by the method of my invention are light in color and of a relatively high melting point they are capable of use in a wide variety of industries. They may be readily employed in the manufacture of paint, varnishes, lacquers, antiseptics, degreasing compositions, cleaning compositions and the like. In instances where an increased melting point is desired, these resins are readily blended with various hardening agents such as hexamethylenetetramine and the like which increase the melting point.

The term "terpene" as employed in the specification and appended claims is intended to consist of terpene hydrocarbons of the $C_{10}H_{16}$ series and mixtures of such hydrocarbons.

While the invention has been disclosed in terms of specific examples employing certain materials in definitely stated proportions, the description is intended to be merely illustrative. It is obvious that various modifications may be made without departing from the spirit of the invention and it is to be understood that the invention is limited only by the appended claims.

I claim:

1. A process of preparing a synthetic resin which comprises reacting a terpene and a phenol in the presence of a molecular compound of boron trifluoride and separating the resinous product formed from the reaction mixture.

2. A process of preparing a synthetic resin which comprises reacting a terpene and a phenol in the presence of a molecular compound of boron trifluoride containing about 35% to about 55% by weight of boron trifluoride and separating the resinous product formed from the reaction mixture.

3. A process of preparing a synthetic resin which comprises reacting a terpene and a phenol in the presence of a molecular compound of boron trifluoride containing about 45% by weight of boron trifluoride and separating the resinous product formed from the reaction mixture.

4. A process of preparing a synthetic resin which comprises reacting a terpene and a phenol in the presence of a molecular compound of boron trifluoride at a temperature of about 30° C. to about 70° C. and separating the resinous product formed from the reaction mixture by vacuum distillation.

5. A process of preparing a synthetic resin which comprises reacting a terpene and a phenol in the presence of a molecular compound of boron trifluoride at a temperature of about 30° C. to about 70° C. and at pressure sufficient to prevent the volatilization of said molecular compound and separating the resinous product formed from the reaction mixture by vacuum distillation.

6. A process of preparing a synthetic resin which comprises reacting a terpene and a phenol in the presence of a molecular compound of boron trifluoride and an inert solvent and separating the resinous product formed from the reaction mixture.

7. A process of preparing a synthetic resin which comprises reacting about five to about six parts by weight of a terpene with about one part by weight of a phenol in the presence of a molecular compound of boron trifluoride and an inert solvent, at a temperature of about 30° C. to about 70° C. and separating the resinous product formed from the reaction mixture by vacuum distillation.

8. A process of preparing a synthetic resin which comprises reacting about five to about six parts by weight of alpha pinene and about one part by weight of a phenol in the presence of a molecular compound of boron trifluoride at a temperature of about 30° C. to about 70° C. and at a pressure of about one atmosphere to about ten atmospheres and separating the resinous product formed from the reaction mixture by vacuum distillation.

9. A process of preparing a synthetic resin which comprises reacting about five to about six parts by weight of turpentine and about one part by weight of a phenol in the presence of a molecular compound of boron trifluoride at a temperature of about 30° C. to about 70° C. and at a pressure of about one atmosphere to about ten atmospheres and separating the resinous product formed from the reaction mixture by vacuum distillation.

10. A process of preparing a synthetic resin which comprises mixing a terpene and a phenol and adding said mixture to a molecular compound of boron trifluoride, and separating the resinous product formed from the reaction mixture.

11. A process of preparing a synthetic resin which comprises mixing about five to about six parts by weight of a terpene with about one part by weight of a phenol, adding said mixture to a molecular compound of boron trifluoride and separating the resinous product formed from the reaction mixture.

12. A process of preparing a synthetic resin which comprises mixing about five to about six parts by weight of a terpene with about one part by weight of a phenol, adding said mixture to a molecular compound of boron trifluoride containing about 35% to about 55% by weight of boron trifluoride, and separating the resinous product formed from the reaction mixture.

13. A process of preparing a synthetic resin which comprises mixing a terpene and a phenol, adding said mixture to a molecular compound of boron trifluoride and an inert solvent, and separating the resinous product formed from the reaction mixture.

14. A process of preparing a synthetic resin which comprises mixing about five to about six parts by weight of a terpene and about one part by weight of a phenol, adding said mixture to a molecular compound of boron trifluoride, said addition taking place in a period of about thirty minutes to about one hour, and separating the resinous product formed from the reaction mixture.

15. A process of preparing a synthetic resin which comprises reacting a mixture of terpene, phenol, and terpene dipolymer in the presence of a molecular compound of boron trifluoride; and separating the resinous product from the reaction mixture.

16. In a process of preparing a synthetic resin, the step of reacting terpene and phenol in the presence of a molecular compound of boron trifluoride and aliphatic ether.

17. In a process of preparing a synthetic resin, the step of reacting terpene and phenol in the presence of a molecular compound of boron trifluoride and diethyl ether.

18. In a process of preparing a synthetic resin, the step of reacting terpene and phenol in the presence of a molecular compound of boron trifluoride and ethyl propyl ether.

19. In a process of preparing a synthetic resin, the step of reacting terpene and phenol in the presence of a molecular compound of boron trifluoride and methyl propyl ether.

PAUL O. POWERS.